United States Patent [19]
Chiang

[11] Patent Number: 5,483,462
[45] Date of Patent: Jan. 9, 1996

[54] ON-LINE METHOD FOR DETERMINING POWER SYSTEM TRANSIENT STABILITY

[75] Inventor: Hsiao-Dong Chiang, Ithaca, N.Y.

[73] Assignee: Cornell Research Foundation, Inc., Ithaca, N.Y.

[21] Appl. No.: 519,613

[22] Filed: May 7, 1990

[51] Int. Cl.$^6$ .................................................. H02H 3/06
[52] U.S. Cl. .............................. 364/492; 361/59; 361/62; 361/111; 361/115; 307/39; 307/132 EA; 307/97
[58] Field of Search ..................... 364/492, 493, 364/494, 495, 483; 307/31, 38, 39, 132 EA, 96, 97, 102; 361/52, 54, 59, 62, 111, 115; 322/18, 22, 23

[56] References Cited

U.S. PATENT DOCUMENTS

| | | | |
|---|---|---|---|
| 3,903,402 | 9/1975 | Petit et al. | 364/495 X |
| 4,084,103 | 4/1978 | Burns, III et al. | 367/132 R |
| 4,541,058 | 9/1985 | Andow et al. | 364/483 |
| 4,577,254 | 3/1986 | Yamawa | 364/492 X |
| 4,641,248 | 2/1987 | Suzuki et al. | 364/492 |
| 4,680,706 | 7/1987 | Bray | 364/492 |
| 4,785,405 | 11/1988 | Hasegawa et al. | 364/492 X |
| 4,800,509 | 1/1989 | Nimmersjö | 364/492 |
| 4,803,635 | 2/1989 | Andow | 364/483 |
| 4,845,594 | 7/1989 | Wilkerson | 364/483 X |
| 4,853,175 | 8/1989 | Book, Sr. | 364/492 X |
| 4,868,410 | 9/1989 | Nakamura | 364/492 X |
| 4,974,140 | 11/1990 | Iba et al. | 364/492 X |
| 4,987,513 | 1/1991 | Shelley | 361/92 |

OTHER PUBLICATIONS

EPRI Project 2206–3 Final Report, Aug., 1985 "Transient Stability Program Output Analysis".
EPRI Project 2206—Final Report, Dec. 1986 "Direct Analysis of Transient Stability for Large Power System".
EPRI Project 4000–18 Final Report, Jul. 1991 "Evaluation of Transient Energy Function Method Software for Dynamic Security Analysis".
EPRI Project 2206–5 Final Report, Sep. 1987 "Extending Applications of the Transient Energy Function Method".
Chiang et al., "Foundations of the Potential Energy Boundary Surface Method for Power System Transient Analysis," IEEE Transactions on Circuits and Systems, vol. 35, No. 6, Jun. 1988, pp. 712–728.
Chiang et al., "Foundations of Direct Methods for Power System Transient Stability Analysis," IEEE Transactions on Circuits and Systems, vol.–CAS 34, No. 2, Feb. 1987.
Varaiya et al., "Direct Methods for Transient Stability Analysis of Power Systems: Recent Results," Proceedings of the IEEE, vol. 73, No. 12, Dec. 1985.

Primary Examiner—Vincent N. Trans
Attorney, Agent, or Firm—Salzman & Levy

[57] ABSTRACT

A fast and reliable method for determining power system transient stability is presented for on-line power system dynamic security assessment. This method is based on the direct (Lyapunov theory) approach controlling the unstable equilibrium point (UEP). Lyapunov technique, however, cannot be used on-line, since calculating the controlling UEP is a computational intensive problem, even for a computer. The invention comprises determining the controlling UEP of a reduced system and relates the controlling UEP of the reduced system to the controlling UEP of the original system. The invention has a sound theoretical basis. The invention eliminates the difficulty of having to find the controlling UEP. The method of the invention determines the constant energy region that surrounds the controlling UEP of the original system. This region is used to approximate the stability region boundary intersection point that a particular fault trajectory will traverse.

2 Claims, 7 Drawing Sheets

$$\begin{cases} \dot{X} = Y \\ M\dot{y} = -Dy - \dfrac{\partial V}{\partial X} \end{cases} \qquad \dot{x} = -\dfrac{\partial V}{\partial X}$$

$$\dot{x} + \dfrac{\partial V}{\partial X} = 0$$

$$M\ddot{x} + D\dot{x} + \dfrac{\partial V}{\partial X} = 0$$

$$\in I\,\ddot{X} + D\dot{x} + \dfrac{\partial V}{\partial X} = 0$$

$$\dot{x} + D^{-1}\dfrac{\partial V}{\partial X} = 0$$

FIG.6

$$\dot{x} + \dfrac{\partial V}{\partial X} = 0$$

ON-LINE METHOD FOR DETERMINING POWER SYSTEM TRANSIENT STABILITY

This invention was made with Government support under Grant No. ESC-8810544, awarded by the National Science Foundation. The Government has certain rights in the invention.

BACKGROUND OF THE INVENTION

Electrical power systems are continually experiencing disturbances. Of primary concern to the power industry are those disturbances classified as event disturbances, which include generator outages, short-circuits caused by lightning, sudden large load changes, or a combination of such events. It is of critical importance to be able to predict the ability of the power system to reach an acceptable steady-state operating environment after an event disturbance. This is the area of concern in system transient stability analysis.

The present invention relates to methods for analyzing power systems and, more particularly, to an on-line method for determining power system transient stability.

An event disturbance usually leads to a change in the configuration of the power system. Load disturbances are the small random fluctuations in load demands. The system usually remains unchanged after load disturbances.

In a power system the transient stability of concern is the synchronization of the phase and rotational velocity of the generators.

Power system operation is divided into three operating phases or operational configurations: pre-fault, fault-on, and post-fault. Transient stability is the study of whether the post-fault system will converge (tend) toward an acceptable steady state as time increases.

Consider the following possible scenario. An event disturbance, such as lightning, causes a short circuit in a power system. The surge in current demand caused by the short circuit causes a protective circuit breaker to trip, disconnecting the short circuit from the system. The sudden change in the load upon the generators causes at least one of them to overspeed, increasing the voltage on the system. If the post-fault condition becomes stable, the overspeeding generator will be gradually brought down to the same speed as the other generators in the system. If the post-fault conditioning will not stabilize, however, other circuit breakers could open in a chain reaction. In one worst case scenario, a significant amount of the power system generators may go off-line to protect themselves. The subsequent reduction in the service to utility customers, and the time required to reconnect the various generators and bring them back on-line, could be very costly and inconvenient. At present there is no convenient and reliable way of predicting when such an unstable condition is imminent.

Transient stability analysis is routinely performed by a utility company during system planning. The industry standard for transient stability varies from region to region, but in general requires the ability of the system to withstand severe event disturbances, such as a three-phase fault condition in close proximity to a generator with a stuck breaker.

Until recently transient stability analysis has been performed by utilities exclusively by means of the numerical integration of nonlinear differential equations describing the fault-on condition and the post-fault condition. Computer programs that can handle 2000 buses and 300 generators with detailed models are available, but may take several hours of computer time to run. Since the time interval of interest in transient stability analysis is between a few milliseconds and a few seconds, simulation for on-line security analysis which require a fast and reliable method has not been feasible, until this invention.

Mathematically the problem of transient stability in accordance with this invention can be defined by three sets of differential equations, one each for the pre-fault, fault-on, and the post-fault conditions:

$$\dot{x}(t)=f_1(x(t)), -\infty<t<t_F$$

$$\dot{x}(t)=f_F(x(t)), t_F \leq t<t_p$$

$$\dot{x}(t)=f(x(t)), t_p \leq t<\infty \quad (1)$$

where $t_f$ is the time of fault occurrence and $t_p$ the time of fault clearance.

Since the power system varies with time a value can be calculated that is indicative of the state of a system at any given moment, which in turn can be used to determine if the system will be stable at a future point in time.

The state or condition of a system is represented by a set of numbers. These values, combined with input functions, are introduced into the equations describing the dynamics of the power system. The solution to the equations provides a prediction of the future state and output of the system. The state or condition of a system is expressed as a function of time.

All the states of a system are said to exist in state space. The path the state or condition of a system follows as time progresses is known as a "trajectory".

One of the most important determinations is whether the post-fault trajectory of the system will approach a stable equilibrium point. This will determine transient stability. Around each stable equilibrium point (SEP) is a region of stability. Any point within this stability region will approach the SEP with respect to time.

At the time a fault occurs, the system is at an SEP. While the fault is occurring, the system begins a fault trajectory out of the region of stability. If the fault is cleared before the trajectory leaves the stability region, then the post-fault condition will be stable. The time between the fault occurrence and the time when the post-fault trajectory leaves the stability region is defined by $t_c$, the critical time.

For a power system having N generators, the classical model of the dynamics of the $i^{th}$ generator is governed by the equations:

$$\dot{\delta}_i = \omega_i \quad (2\text{-a})$$
$$M_i \dot{\omega}_i = P_i^m - D_i \omega_i - P_i^e \quad (2\text{-b})$$
$$P_i^e = E_i^2 G_{ii} - \sum_{j=1}^{n+1} E_i E_j Y_{ij} \cos(\delta_i - \delta_j - \phi_{ij}) \quad (2\text{-c})$$

Figure 1:
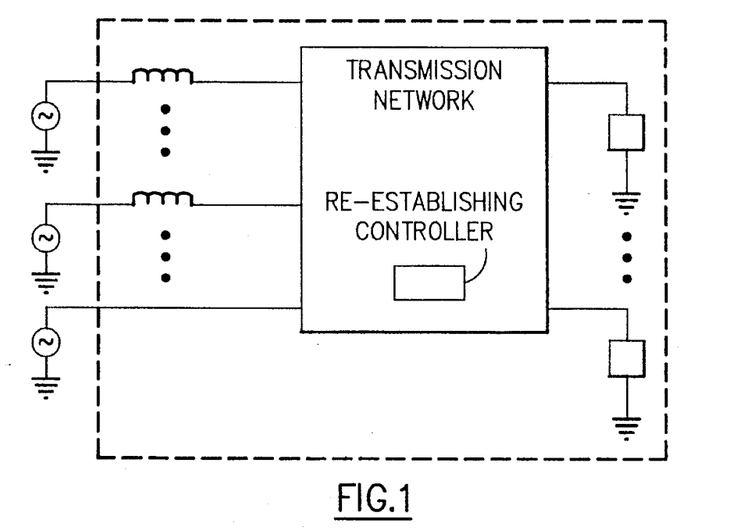
FIG. 1 is a schematic diagram of the classical model of an electric power network.

Equations 2-a and 2-b represent rotor mechanics; $\delta_i$, $w_i$ are the respective angle and speed deviations (from a synchronous reference) of the ith rotor; $M_i$ and $D_i$ are respective inertia and damping constants of the ith generation; $P_i^m$ is the constant mechanical input power; and $P_i^e$ is determined by the electrical network. The $i^{th}$ generator is configured as a voltage source of constant magnitude $E_i$ and phase $\sigma_i$ driving (through a transient reactance) an electric network consisting of transmission lines and loads, configured as constant impedances. Viewed as an N port driven by the voltage sources $E_i \angle \delta_i$, this network is described by the reduced complex admittance matrix Y with coefficients $Y^i \angle \phi_{ij}$ (see FIG. 1). The real, positive diagonal terms $G_{ii}$ of Y are separated as indicated. Equation 2-c gives the real power delivered to the electric network by the ith generator. In this N generator system, node N+1 is an infinite bus, with $E_{n+1}=0$ and $\delta_{n+1}=0$. Thus the voltage at node n+1 serves as a synchronous reference.

Equations 2a, 2b, 2c represent the post-fault condition. Suppose there is a set of (i elements) stable equilibrium points for the system described by 2a, 2b, 2c that is pairs of $\delta_i$, $w_i$, where $w_i$ is zero. Then, if it is assumed for purposes of this description that the transfer conductances are zero, a version of equations 2a, 2b, 2c can be derived where the stability region can be estimated:

$$\dot{\delta}_i = \omega_i \quad (3\text{-a})$$

$$M_i \dot{\omega}_i = P_i - D_i \omega_i - \sum_{j=1}^{n+1} E_i E_j Y_{ij} \sin(\delta_i - \delta_j). \quad (3\text{-b})$$

Using Lyapunov theory, a direct method of determining the transient stability of the post-fault condition can be deduced.

Let $(\delta_s, w_s)$ be a stable post-fault equilibrium. Define the energy function $V(\delta, w)$ of the state:

$$V(\delta,\omega) = \frac{1}{2} \sum_{i=1}^{n} M_i \omega_i^2 - \sum_{i=1}^{n} P_i(\delta_i - \delta_i^s) \quad (4a)$$

$$- \sum_{i<1}^{n+1} E_i E_j Y_{ij} [\cos(\delta_i - \delta_j) - \cos(\delta_i^s - \delta_j^s)] \quad (4\text{-b})$$

At the post-fault equilibrium, $V(\delta_s, w_s)=0$. Differentiating $V(\delta_s, w_s)$ along the trajectories of equation 3 gives $$\frac{d}{dt} V(\delta,\omega) = \frac{\partial V}{\partial \delta} \dot{\delta} + \frac{\partial V}{\partial \omega} \dot{\omega} = - \sum_{i=1}^{n} D_i \omega_i^2 < 0. \quad (5)$$

This inequality shows that V qualifies for use as a Lyapunov function since $V(\delta(t),w(t))$ must decline along the post-fault trajectory.

Lyapunov theory then leads to the following approach to finding if the post-fault condition is converging toward stability:

Theorem 1

Let $v>0$ be a constant such that on the boundary of the stability region one has $V(\delta,w)>v$. Then the connected component containing $(\delta_s,w_s)$ of the set $R(v)=\{\delta,w)<v\}$ is inside the stability region.

Three observations can be made. First, Theorem 1 is not an immediate consequence of general Lyapunov theory, since $V(\delta,w)$ does not become unbounded as the absolute value of $\delta$ goes to infinity.

Second, Theorem 1 provides an estimate of the stability region. To get the best estimate (the largest R(v)), one must choose v as large as possible. The largest value $V_{cr}$ is $V_{cr}=\min\{V(\delta,w)|(\delta,w)$ that are elements of the set of stability points on the boundary of the stability region). It can be deduced that $V_{cr}=\min$ UEP $\{V(\delta_e,w_e)\}$ where the minimization is over all the unstable equilibrium points (UEPs) $(\delta_e,w_e)$ that are elements of the set of stability points on the stability region boundary. The UEP that achieves this minimum is called the critical UEP.

Figure 2:
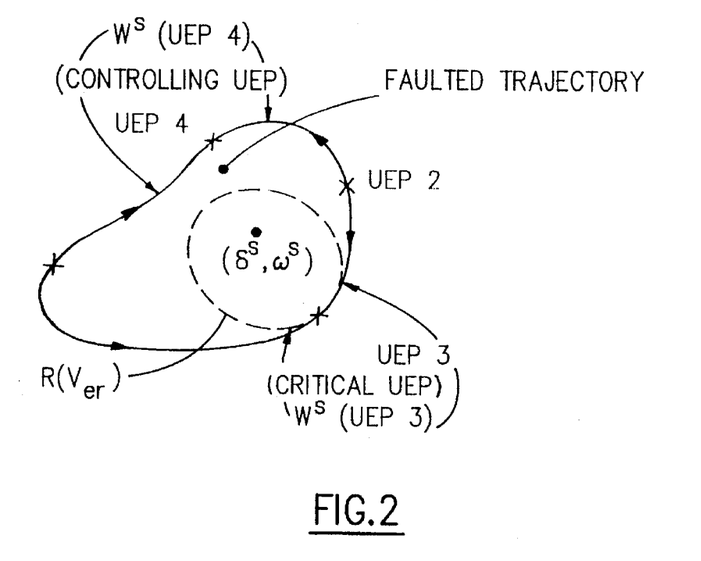
FIG. 2 is a sample state space diagram illustrating the concepts of faulted trajectory, controlling UEP and critical UEP.

Third, $R(V_{cr})$ is an underestimate of the stability region; see FIG. 2.

Theorem 1 suggests a stability criterion, according to the following three step procedure:

Step 1: Calculate the UEP lying on the boundary of the stability region. Calculate $V_{cr}=\min$ UEP $\{v(\delta_e,w_e)\}$ Step 2: Evaluate v along the faulted trajectory $(\delta(\delta(\tau), w(\tau))$. If this v is less than $V_{cr}$ then $\tau$ is less than $\tau_c$ (critical time ) and the system is stable.

Step 3: The value $\tau_{cr}$ of $\tau$ for which $\delta(\tau)$, $w(\tau)=V_{cr}$ provides an estimate of the true critical clearing time $\tau_c$.

This procedure is known as the critical UEP technique.

The main computational difficulty in implementing this procedure is the calculation of the UEP in step 1. Observe that $(\delta_e, w_e)$ is an equilibrium of the aforementioned equations:

$$\dot{\delta}_i = \omega_i \quad (3\text{-a})$$

$$M_i \dot{\omega}_i = P_i - D_i \omega_i - \sum_{i=1}^{n+1} E_i E_j Y_{ij} \sin(\delta_i - \delta_j). \quad (3\text{-b})$$

if and only if $w_s = 0$ and $$P_i = \sum_{j=1}^{n+1} E_i E_j Y_{ij} \sin(\delta_i^e - \delta_j^e), i = 1, \ldots, n \quad (6)$$

These are essentially the real power flow equations and are difficult to solve.

Moreover as observed already, $R(V_{cr})$ is an underestimate of the stability region. Put differently, the boundary of the stability region is poorly approximated by the surface of constant energy $\{V(\delta,w)=V_{cr}\}$. For the same reason $\tau_{cr}$ is an underestimate of the true critical clearing time $\tau_c$.

A much improved estimate of $\tau_c$ can be obtained. It can be shown that the boundary of the stability regions is composed of the stable manifolds of the UEP that lie on the boundary. For instance in FIG. 2, the stability boundary is the union of the stability regions of UEP 4 and UEP 3. Also UEP 3 is the critical UEP and so $V_{cr}<V(\text{UEP i})$ for i=3,4. Now consider the faulted trajectory $(\delta(\tau), w(\tau))$ as shown. It leaves the stability region by exiting the boundary through the region of stability of UEP 2. Hence, an estimate of the critical time is given by $\tau_{co}$, where:

$$v(\delta(\tau_{co}), \omega(\tau_{co}))=v(uep2)=v_{co} \quad (7)$$

Since $V_{co}>V_{cr}$, this estimate will be superior to $\tau_{cr}$, obtained previously. The equilibrium UEP 2 is called the controlling UEP corresponding to the faulted trajectory. Note that the controlling UEP depends on the faulted trajectory, but that the critical UEP does not.

A two step controlling UEP procedure can be outlined:

Step 1: From the faulted trajectory $\delta(\tau), w(\tau))$ estimate the controlling UEP $(\delta_{co}, w_{co})$. Calculate $V_{co}= V(\delta_{co}, w_{co})$.

Step 2: The value $\tau_{co}$ again by $$v(\delta(\tau_{co}), w(\tau_{co}))=v(uep2)=v_{co} \quad (7)$$

gives an estimate of the critical clearing time $\tau_c$.

Once the critical clearing time is established, a system can be controlled. Appropriate measures can be used to bring generators back on-line more rapidly, or to shutdown certain generators of the system if post-fault stability will not be reached.

SUMMARY OF THE INVENTION

A method for determining power system transient stability is presented for controlling power systems on-line. This method is based on the direct (Lyapunov theory) approach controlling UEP technique.

The fundamental problem with the Lyapunov technique is the difficulty of calculating the controlling Unstable Equilibrium Point, which is a computationally intensive problem, even for a computer. The Lyapunov technique, therefore, cannot be used on-line. The invention comprises an on-line approach utilizing a modified Potential Energy Boundary Surface determination representing a stability region. This region is used to predict the critical clearing time for various on-line faults in a power system. The invention eliminates the difficulty of having to find the controlling UEP of the original system (3). The method of the invention determines the controlling of a reduced system and relates the controlling UEP of the reduced system to the controlling UEP of the original system.

The results of the inventive method were in close agreement with calculated conventional off-line results utilizing the cumbersome numerical integration of the differential equations describing the power system. The conventional technique is not practical, but has been used herein as a check upon the accuracy and precision of the invention.

It should be understood that, while commercial high power generating and distributing systems are described primarily herein, the invention is not limited to such industrial systems, but may also find application in any other electrical power systems such as telecommunications, computer networks, distributed robotic controls and the like.

A BRIEF DESCRIPTION OF THE FIGURES

A complete understanding of the present invention may be obtained by reference to the accompanying figures, when taken in conjunction with the detailed description thereof and in which.

DESCRIPTION OF THE PREFERRED EMBODIMENT

Generally speaking, the invention features a new method of stability analysis for power systems.

Figure 1A:
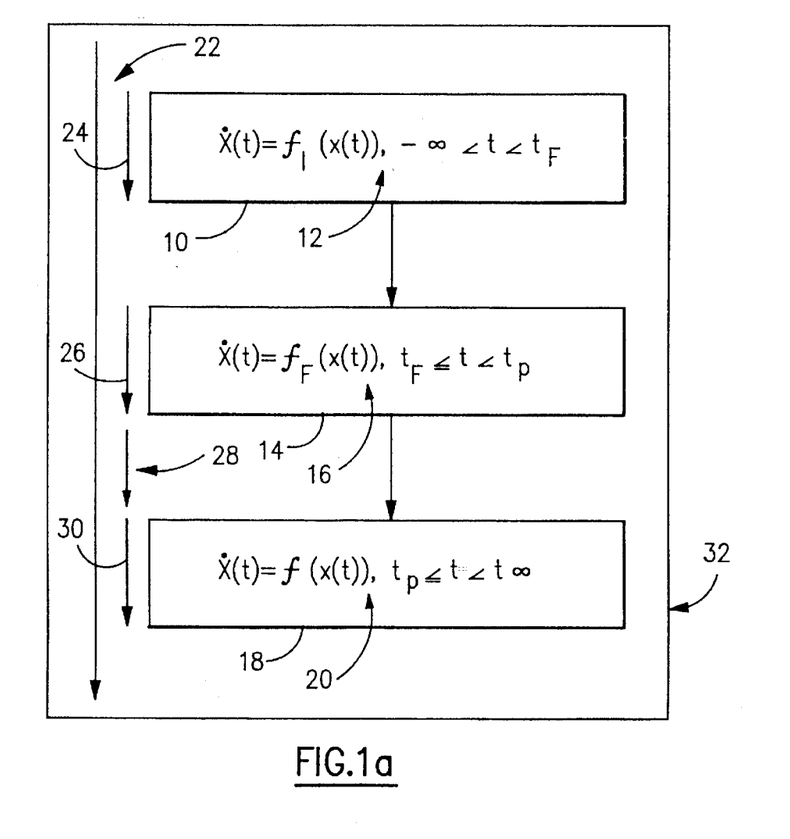
FIG. 1a shows a fault state diagram.

Referring now to FIG. 1a, when a power system has had an event disturbance it can be said to experience a move from a Pre-Fault State 10 (a stable steady state) to a Fault-On State 14 coming to a Post-Fault State (a stable steady state) 18 during a period of time 22. Protective relays are placed strategically throughout the power system to detect faults and to trigger the opening of circuit breakers to isolate the fault. The fault occurs and the power system is then in the faulted condition 14 before it is cleared by the protective system operation. The transient stability problem is the study of the asymptotic stability of the post-fault system 18, with the initial condition given by the faulted system 14 response.

As depicted in FIG. 1a, the dynamic system 32 can be described by the set of differential equations: 12, 16 and 20 respectively for each state. x(t) is the vector of the state variables of the system at time t 22. At some time $t_f$ 26, the system undergoes a fault (structural change). This is represented by the change in the dynamics governing the system behavior from $f_I$ 24 to $f_F$ 26. Prior to the fault, the system is in a pre-fault 10 condition $f_I$ 24.

The fault duration is confined to the time interval $\{t_F, t_P\}$. During this interval, the system is governed by the fault-on 14 dynamics $f_F$. At time $t_P$ 28, the fault is cleared and the system is henceforth governed by the post-fault 18 dynamics f 30.

During pre-fault 10, the system is at a known stable equilibrium point, $x_I$ reducing the analysis to the following equations:

$$\dot{x}(t)=f_F(x(t)), \ t_F \leq t < t_p, \ x(t_F)=x_I \qquad \text{EQ. 1}$$

$$\dot{x}(t)=f(x(t)), \ t_p \leq t < \infty \qquad \text{EQ. 2}$$

At the end of the fault period the state of the system is $$x_p := \Phi = (x_I, \ t_p - t_F) \qquad \text{EQ. 3}$$

which represents the state of the fault-on 14 system 16 at time t 22 if it is in state x at time 0.

Post-fault 18 system 20 has a stable equilibrium point $x_s$. Then $f(x^s)=0$, and $x^s$ is stable. This identifies the fundamental problem of transient stability as follows: Starting in the post-fault 18 initial state $x_p$, will the post-fault 18 system converge to the equilibrium point $x_s$?

$$lim \Phi(x_p, t)=x_s \qquad \text{EQ. 4}$$
$$t \to \infty$$

Here $\phi(x,t)$ is the state of the post-fault 18 system 20 at time t if its state at time 0 is x. In other words, transient stability analysis essentially determines whether the fault-on trajectory at clearing time is lying inside the stability region (domain of attraction) of a desired stable equilibrium point (SEP) of its post-fault 18 system. Transient stability analysis does not estimate the whole stability boundary of the post-fault 18 system. Instead, only the relevant part of the stability boundary towards which the fault-on trajectory is heading is estimated.

Until recently transient stability analysis was performed only off-line as a function of power system reliability planning. The method used was a time-domain numerical simulation. This required computer programs which handled large numbers of buses and generators in detailed simulation models for a given fault and examined the simulated system response to these faults. Typically, ten or more simulations were required, with each simulation requiring 15 minutes of CPU time. As the requirements of reliability planning became more stringent, the move to on-line security analysis became more attractive as a critical guarantor of power system reliability. The time-domain simulations used off-line were inadequate, as the time interval of interest for transient stability analysis ranges from a few milliseconds to a few seconds.

One set of alternative approaches, known in the art as "direct methods" were proposed based on the Lyapunov theory. Critical to an understanding of these methods is stability boundary theory and the definition of the classical model.

Stability Boundary Definition

Figure 2A:
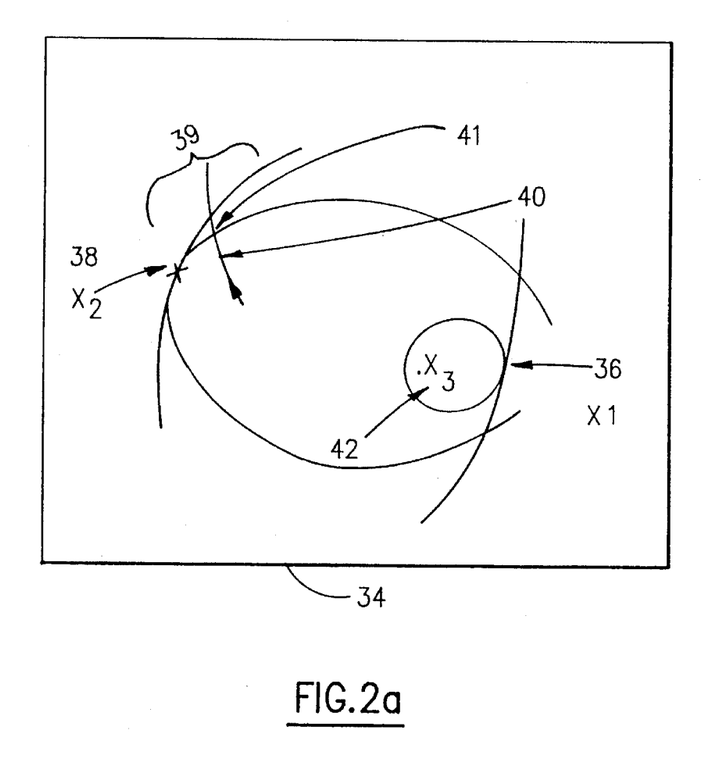
FIG. 2a depicts a stability region diagram.

Referring now to FIG. 2a, the following definitions are needed to discuss stability boundaries of nonlinear autonomous dynamical systems described by $\dot{x}=f(x)$ 34 where the vector field f is C' and it maps $R^N$ into $R^N$:

(a) The point $x_i$ (where i=1,2, . . . ) 36, 38, 42 is equilibrium point (EP) if $f(x_i)=0$.

(b) The derivation of f at $x_i$ is called the Jacobian matrix at x and is denoted by $J(x_i)$.

(c) An equilibrium point is hyperbolic if the Jacobian has no eigenvalues with zero real part.

(d) If all the eigenvalues of the Jacobian have a negative real part then it is a stable equilibrium point (SEP) 42.

(e) An EP is an unstable equilibrium point (UEP) if not all of its eigenvalues have a negative real part 38.

(f) If all the eigenvalues of an EP have a positive real part it is called a source.

(g) The type of the EP is defined to be the number of eigenvalues with a positive real part. Thus if an EP has exactly one eigenvalue with positive real part it is called a type-one equilibrium point.

(h) For an SEP $x_s$, there is a region in the state space from which trajectories converge to $x_s$. This is called the stability region 39.

The following assumptions are necessary when considering the stability boundary of nonlinear autonomous dynamic systems:

(a) That a stable equilibrium point (SEP) exists.

(b) All the equilibrium points (EP) on the stability boundary are hyperbolic.

(c) The intersection of the stable manifold ($W^s(x_i)$) and the unstable manifold ($W^u(x_j)$) satisfies the transversality condition for all the EP's $x_i, x_j$, on the stability boundary.

(d) There exists an energy function (C') such that:
  i. $\dot{V}(\Phi(x,t)) \leq 0$ at $x \in E$;
  ii. If x is not an equilibrium point, then the set (t ∈: $\dot{V}(\Phi(x,t))=0$) has the measure 0 in R;
  iii. V ($\Phi(x,t)$) is bounded implies $\Phi(x,t)$ is bounded.

Conditions (i) and (ii) above imply that every trajectory must either go to infinity or converge to one of the equilibrium points 41.

The two fundamental theorems, well known in the art and based on the above assumptions, concerning the topological properties of stability regions, show that the stability boundary is composed of the union of all stable manifolds of the UEP's on the stability boundary.

Theorem 1 (necessary and sufficient condition for UEP to be on the stability boundary) states $x_i$ is an unstable equilibrium point (UEP) on the stability boundary $\partial A(x_s)$ of a stable equilibrium point (SEP) $x_s$ if and only if $W^u(x_i) \cap A(x_s) \neq \Phi$.

Theorem 2 (characterization of the stability boundary) states: let $x_i$, where i=1,2, . . . , be the unstable equilibrium points on the stability boundary $\partial A(x_s)$ of a stable equilibrium point $x_s$. Then $\partial A(x_s) = x_i \in E \cap \partial AW_s(x_i)$.

In addition, the energy function and the equilibrium points theorem proves that:

(a) The point at which the energy function achieves the minimum is the equilibrium point $x_i$ itself.

(b) On the stability boundary of $x_s$, the point at which the energy function achieves the minimum and typically is a type-one equilibrium point.

(c) If it is assumed that the stability region $A(x_s)$ of $x_s$ is bounded, then on the stability boundary $\partial A(x_s)$, the point at which the energy function achieves a local maximum must be a source.

Considerable progress has been made in the application of direct methods to power system transient stability analysis. As aforementioned, power system transient stability is concerned with a system's ability to obtain an acceptable steady-state operating condition following a large disturbance, called a fault. The mathematical model of a power system for transient stability analysis is a set of nonlinear differential equations. Mathematically, the transient stability analysis is to determine the stability of the post-fault system trajectory.

Figure 3A:
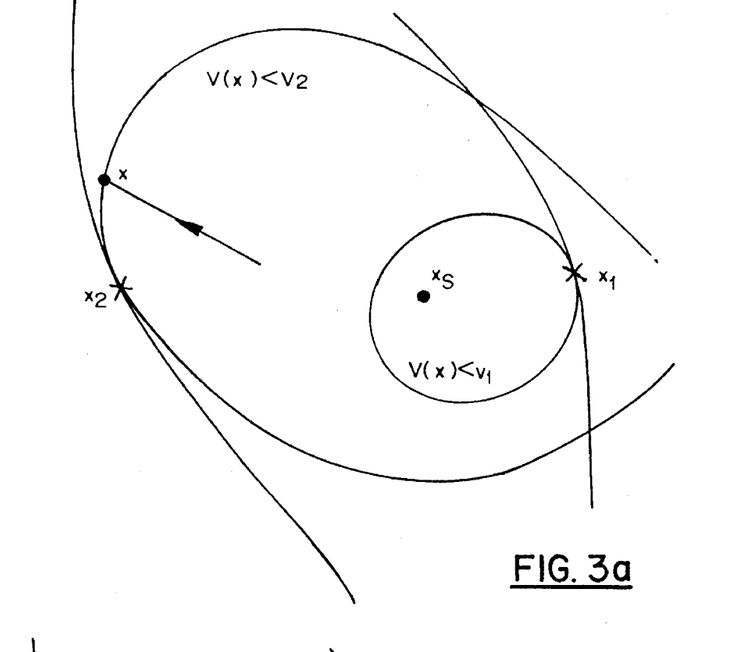
FIGS. 3a and 3b show post-fault system state space diagram for a one machine, infinite bus model.

Consider the state space of the post-fault system, as shown in FIG. 3a. Let $x_s$ be the stable equilibrium point (SEP), that is an acceptable steady state operating condition. If the initial state of the post-fault system x, (i.e., the state at which the fault is cleared) lies inside the stability boundary, then the post-fault system trajectory will be stable. To determine whether the post fault system trajectory is stable, the so-called closest unstable equilibrium point (UEP) method compares the value of the energy function V(.) at every UEP ($x_1, x_2, \ldots$), finds the lowest value V1 and defines a region, the set {x: V(x)< V1}. This region is a subset of the stability region, as shown in FIG. 3a. Clearly, for a fault on a trajectory moving towards $x_2$, the region determined above yields a result that is too conservative to be useful.

Another approach, called the controlling UEP method, suggests the use of the region employing the value of the energy function at $x_2$ (i.e., the set {(x: V(x)<V2=V($x_2$))}) as a local approximation of the stability boundary. The problem with this method is that there is no simple way of determining the controlling UEP.

Figure 3B:
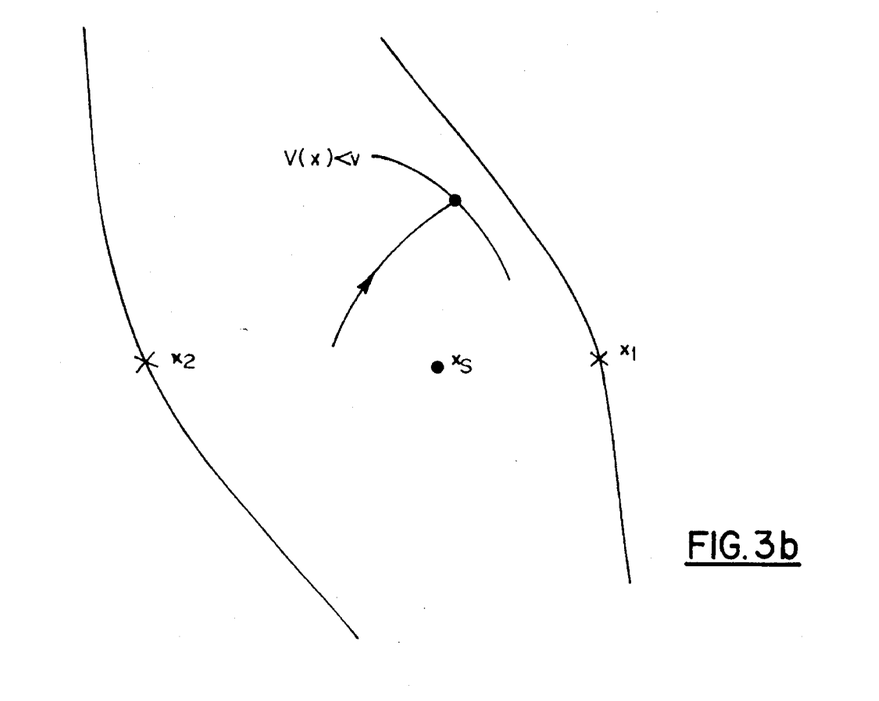

The inventive method of this invention is intended to circumvent the need to determine the controlling UEP of the original system. For a given fault-on trajectory, the method finds a "local" approximation of the stability boundary as depicted in FIG. 3b. The process of finding this local approximation is associated with the determination of the stability boundary of a lower dimensional system and is computationally rather efficient. The derivation is described below.

Figure 4A:
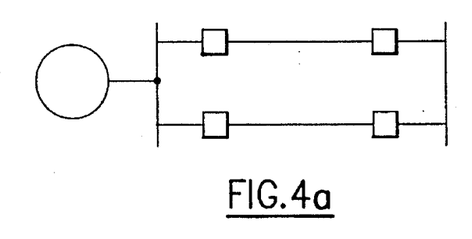
FIGS. 4a and 4b show a one machine, infinite bus schematic diagram and potential energy graph.

Consider the one machine infinite bus system in FIG. 4a. The system is described by the following equations:

$$\frac{d}{dt} x = \dot{x} \tag{1-1}$$

$$M \frac{d}{dt} \dot{x} = -D\dot{x} - k\sin x + p$$

where $x=\delta$, the phase angle of the machine with respect to the infinite bus. The equilibrium points are at:

$$x = \sin^{-1}\frac{p}{k} \quad \dot{x} = 0$$

Let $x_s$ be the SEP of interest. Consider the energy function for (1-1):

$$V(x,\dot{x}) = \frac{1}{2} m\dot{x}^2 - p(x - x_s) - k(\cos x - \cos x_s)$$

The energy function can be divided into "kinetic energy" and "potential energy" functions:

$$V(x,\dot{x}) = V_k(\dot{x}) + V_p(x) \quad (1\text{-}2)$$
$$V_k(\dot{x}) = \frac{1}{2} m\dot{x}^2$$
$$V_p(x) = -p(x - x_s) - k(\cos x - \cos x_s)$$

Figure 4B:
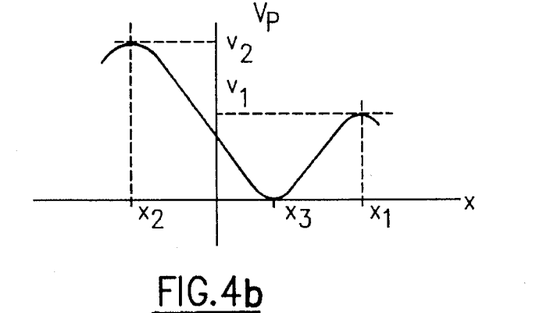

At the equilibrium points of systems of equation (1-1), notice that the derivative of x with respect to time equals zero, and $V_p(x)$ is a local maximum of $V_p$ with respect to x. The potential energy $V_p(.)$ as a function of x is shown in FIG. 4b. The stability boundary of the system is shown in FIG. 3a. Note that:

a) The intersection of the stability region of $x_s$ and the set $\{(x,\dot{x}): \dot{x}=0, x \text{ element of set } R\}$ is $P:=\{x,\dot{x}): x_2<x<x_1, \dot{x}=0\}$ b) The boundary of this one dimensional region P in the x space consists of two points (0 dimensional) $x_1$ and $x_2$.

c) These two points are characterized as being the local maxima of the potential energy function $V_p(.)$.

The PEBS method is based on the above facts and it proceeds as follows:

1) From the potential energy function $V_p(.)$, find the local maxima $x_1$ and $x_2$.

2) For those faults on trajectories $(x(t),\dot{x}(t))$, whose $x(t)$ component moves towards $x_1$, the set $\{(x,\dot{x}): V(x,\dot{x})= V_p(x_1)\}$, is chosen as the local approximation of the stability boundary. For those faults on trajectories $(x(t),\dot{x}(t))$, whose $x(t)$ component moves towards $x_2$, the set $\{(x,\dot{x}): V(x,\dot{x})= V_p(x)_2\}$ is chosen as the local approximation of the stability boundary. It should be pointed out that for the one machine infinite bus system (i), the potential energy boundary is determined solely by $V_p(x)$, and (ii) in this case. The PEBS method is a method that determines just the controlling UEP.

Figure 5:
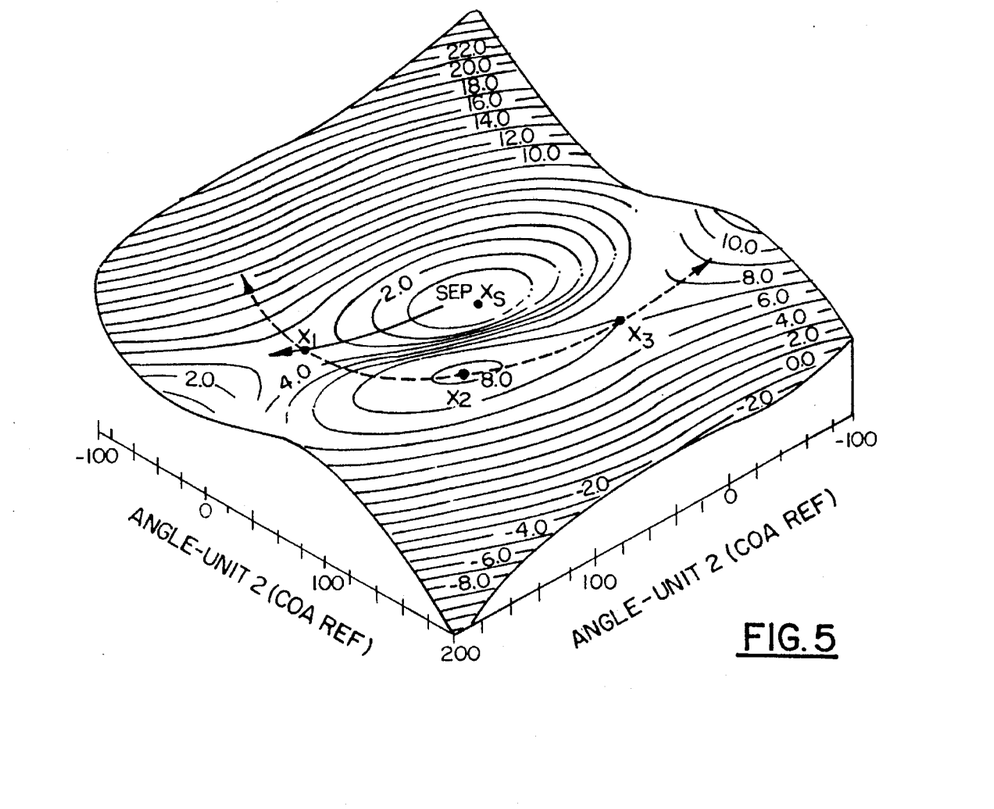
FIG. 5 shows a diagram of a two machine, infinite bus state space example.

The extension of the above ideas to multi-machine cases is non-trivial. Consider, for example a system consisting of two machines and an infinite bus. In this case, $x=(\delta_1,\delta_2)$ and $\dot{x}=(\dot{\delta}_1, \dot{\delta}_2)$. The potential energy $V_p(.)$ as a function of x is shown in FIG. 5. Again the UEP's $x_1,x_2,x_3,\ldots$ are the local maxima of the potential energy function $V_p(.)$ along a certain direction. For example, $x_1$ is the local maximum point of $V_p(.)$ along the direction indication represented by the solid line through $x_1$ in FIG. 5. A Potential Energy Boundary Surface (PEBS) is formed by joining these $V_p$ maxima through the "ridge" of the potential energy level surface, shown as a dotted line in FIG. 5. The PEBS constructed this way is clearly orthogonal to the equi-potential curves $V_p(.)$. Furthermore, along the direction orthogonal to the PEBS, potential energy $V_p(.)$ achieves a local maximum at the PEBS.

In the report by N. Kakimoto, Y. Ohsawa and M. Hayashi, "Transient Stability Analysis of Electric Power System via Lure-Type Lyapunov Function, Part I and II", Trans. IEE of Japan, Vol-98, pp. 516, 1978, the authors suggested a two-step procedure as the basis of the PEBS method:

Step 1) Calculate the fault on trajectory $(x(t),\dot{x}(t))$. Suppose $x(t)$ crosses PEBS at the value V.

Step 2) Use the surface $\{(x,\dot{x}): V(x,\dot{x})<V\}$ as a local approximation of the stability boundary. The derivation of the PEBS method for the multi-machine case, as indicated above, is based on heuristic arguments. Theoretical justification for the PEBS procedure, except for the one machine infinite bus case, is lacking. It is not clear for the multi-machine case whether the PEBS is the intersection of the stability boundary of the multi-machine system with the subspace $\{(x,\dot{x}): \dot{x}=0\}$. Moreover, because of the heuristic way PEBS is derived, it is difficult to see whether the method provides a good local approximation of the stability boundary, or under what conditions it does.

PEBS can be viewed as the stability boundary of the associated gradient system:

$$\dot{x} = -\frac{\partial V_p(x)}{\partial x} \quad (1\text{-}3)$$

of the original system, which is the classical model of power systems consisting of N generators:

$$\dot{x} = y \quad (1\text{-}4)$$

$$M\dot{y} = -Dy - \frac{\partial V_p(x)}{\partial x}$$

where x,y is an element of $R^n$, and M,D are positive diagonal matrices. The motivation behind this approach is the fact that the potential energy $V_p(.)$ is the energy function of the gradient system (1-3). Moreover, note that all the equilibrium points of (1-4) lie on the subspace $\{(x,y): y=0\}$ and at these points $V(x,y)=V_p(x)$.

Figure 6:
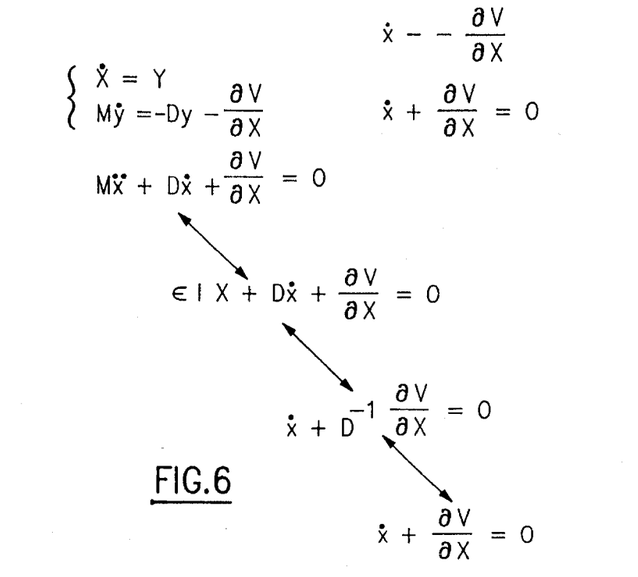
FIG. 6 shows a diagram of three mathematical steps to determine the relationship between the stability boundaries of the original and the reduced system.

To determine the relationship between the stability boundary of system (1-4) and the stability boundary (PEBS) of system (1-3), equation (1-4) is transmuted step by step into (1-3), as shown in FIG. 6. The motivation behind the transmutation in FIG. 6 is that it is desired to compare and study the relationship between the stability boundaries of each pair of systems. Equation (1-4) is rewritten as:

$$M\ddot{x} + D\dot{x} + \frac{\partial V_p}{\partial x} = 0 \quad (1\text{-}5)$$

and equation (1-3) is rewritten as:

$$\dot{x} + \frac{\partial V_p}{\partial x} = 0 \quad (1\text{-}6)$$

If it were possible to eliminate the term $(\ddot{m},\dot{x})$ in (1-5), it would be possible to simply compare:

$$D\dot{x} + \frac{\partial D_p}{\partial x} = 0 \text{ and } \dot{x} + \frac{\partial V_p}{\partial x} = 0 \quad (1\text{-}7)$$

To eliminate the term $(\ddot{M})$, first consider an intermediate step, where the coefficient matrix is small, i.e., $$\epsilon\ddot{x} + D\dot{x} + \frac{\partial V_p}{\partial x} = 0 \quad (1\text{-}8)$$

In other words, determining the relationship between the stability boundaries of (1-3) and (1-4) is done through the following three steps.

Step 1: determine the relationship between the stability boundaries of the systems $$\dot{x} = -\frac{\partial V_p(x)}{\partial x} \tag{1-9a}$$

and $$\dot{x} = -D^{-1}\frac{\partial V_p(x)}{\partial x} \tag{1-9b}$$

where $D^{-1}$, the inverse of matrix D, is also a positive diagonal matrix.

Step 2: determine the relationship between the stability boundaries of the systems $$\dot{x} = y, \, M\ddot{y} = -Dy - \frac{\partial V_p(x)}{\partial x} \tag{1-10a}$$

and $$\dot{x} = y, \, \epsilon I\ddot{y} = -Dy - \frac{\partial V_p(x)}{\partial x} \tag{1-10b}$$

where $\epsilon$ is a small positive number and I denotes the identity matrix.

Step 3: determine the relationship between the stability boundaries of the systems $$x = -D^{-1}\frac{\partial V_p(x)}{\partial x} \tag{1-11}$$

and $$x = y, \, \epsilon I\ddot{y} = -Dy - \frac{\partial V_p(x)}{\partial x} \tag{1-12}$$

Thus, the relationship between the stability boundaries of (1-3) and (1-4) is established by connecting the relationship between the stability boundaries of (1-9a) and (1-9b), (1-10a) and (1-10b), (1-11) and (1-12).

Instead of studying (1-9a) and (1-9b) in step 1, generalize the problem and determine the relationship between the stability boundaries of the following generalized gradient systems:

$$\dot{x} = -D_1 f(x) \tag{1-13a}$$

$$\dot{x} = -D_2 f(x) \tag{1-13b}$$

where: $M_1$, $M_2$ are positive diagonal matrices, and $f(x)$ is a gradient vector.

The approaches that are employed to establish the relationship between the stability boundaries in steps 1 and 2 are quite similar. First, derive a complete characterization of the stability boundaries of these systems. Second, conduct a qualitative analysis of the change in the stability boundaries when the vector fields of these systems are perturbed. In step 3, use the singular perturbation technique to show the relationship between the stability boundaries of (1-11) and (1-12).

Analysis of the PEBS Method

Consider a power system consisting of N generators. Let the loads be modeled as constant impedances. Under the assumption that the transfer conductances are zero, the dynamics of the $i^{th}$ generator can be represented by the following equations:

$$\dot{\delta}_i = \omega_i, \, i = 1, 2, \ldots, n \tag{2-1a}$$

$$M_i\dot{\omega}_i = P_i - D_i\omega_i - \sum_{j=i}^{n+1} E_iE_jY_{ij}\sin(\delta_i - \delta_j) \tag{2-1b}$$

where: node n+1 serves as the reference node, i.e., $E_{n-1}=1$ and $\delta_{N+1}=0$. The damping constant $D_i$ is assumed to be positive.

Power system transient stability analysis is concerned with the system's ability to reach an acceptable steady state operating condition following a large disturbance. Suppose a power system is operated at a stable equilibrium point $x_o$, when a large disturbance (a fault) occurs. The system is then in the fault-on condition (it is a fault-on system) for brief duration before the fault is cleared by protective relay system operation, The system then enters the post-fault condition (e.g., the faulted line may be disconnected). If the system state at the fault clearing time is in the stability region of a stable equilibrium point of the post-fault condition, then the system is transiently stable.

The equations describing the pre-fault, fault-on, and post-fault systems all have the same form as (2-1) except $Y_{ij}$'s are different due to the change in network topology.

Let $(\delta_s, w_s)$ be a stable equilibrium point of (2-1). Define a function $V(\delta, w)$ as follows:

$$\begin{aligned} V(\delta,\omega) &= \frac{1}{2}\sum_{i=1}^{n} M_i\omega_i^2 - \sum_{i=1}^{n} P_i(\delta_i - \delta_i^s) - \\ &\quad \sum_{i=1}^{n}\sum_{j=1+i}^{n+1} E_iE_jY_{ij}[\cos(\delta_i - \delta_j) - \\ &\quad \cos(\delta_i^s - \delta_j^s)] \\ &= V_k(\omega) + V_p(\delta) \end{aligned} \tag{2-2}$$

where $$V_k = \frac{1}{2}\sum_{i=1}^{n} M_i\omega_i^2 \tag{2-2a}$$

is the kinetic energy and $V_p(.)$ is the potential energy. Now, $$\frac{\partial V_p(\delta)}{\partial \delta_i} = -P_i + \sum_{j=1}^{n-1} E_iE_jY_{ij}\sin(\delta_i - \delta_j) \tag{2-2b}$$

$$i = 1, 2, \ldots, n \tag{2-3}$$

and (2-1a), (2-1b) can be expressed as $$\dot{\delta}_i = \omega_i \tag{2-4a}$$

$$M_i\dot{\omega}_i = -D_i\omega_i - \frac{\partial V_p(\delta)}{\partial \delta_i}, \, i = 1, 2, \ldots, n \tag{2-4b}$$

Assume that zero is a regular value of the partial derivative with respect to $\delta$ of $V_p(\delta)$. Note that $M_i>0$, $D_i>0$; the negative of the partial derivative, $\partial V_p(\delta)$ with respect to $\delta$ is a bounded vector field with bounded Jacobian; and the negative partial derivative, $\partial V_p(\delta)$ with respect to $\delta$ satisfies:

$$|B_c(x_i) - B_c(x_j)| > \epsilon, \quad \text{for all } x_i, x_j \in E \tag{A}$$

$$|f(x)| > \delta, \quad \text{for } x \bigcup_{x \in E} B_c(\bar{x}),$$

since it is a periodic vector in $\delta$. The dynamic system (2-4) is, therefore, of the same form as the dynamic system $$\dot{x} = y$$

$$M\dot{y} = -Dy - f(x) \quad (B)$$

with $(x,y) = (\delta, w)$. Using the notation $d_p(M,D)$ to denote system (2-4), and the notation $\partial A_p(M,D)$ to denote the stability boundary of a stable equilibrium point of $D_p(M, D)$.

Differentiating the function $V(\delta, w)$ along the trajectories of system (2-1) or system (2-4) gives $$\dot{V}(\delta, \omega) = \frac{\partial V}{\partial \delta} \dot{\delta} + \frac{\partial V}{\partial \omega} \dot{\omega} \quad (2\text{-}5)$$

$$= -\sum_{i=1}^{n} D_i \omega_i^2 \leq 0.$$

The function $V(\delta,w)$ is therefore an energy function for the system $\partial p(M,D)$.

Since all of the equilibrium points of system (2-4) lie on the subspace $$\{(\delta, \omega) / \delta \in R^n, \omega = 0\} \quad (C)$$

the energy function $V(\delta,w)$ at the equilibrium point $(\delta_e, w_e)$ is of the following form:

$$V(\delta_e, \omega_e) = V_p(\delta_e) \quad (D)$$

This observation is motivation to study the stability region in the $\delta$ subspace $\{(\delta,w): w=0\}$ instead of in the whole state space. In other words, instead of studying the original system (2-4) consider the following gradient system:

$$\dot{\delta} = -\frac{\partial V_p(\delta)}{\partial \delta} \quad (2\text{-}6)$$

Define a dynamic system:

$$d_p(D): \dot{\delta} + D \frac{\partial V_p(\delta)}{\partial \delta} = 0 \quad (E)$$

where: D is a positive diagonal matrix. The system $d_p(D)$ becomes the gradient system (2-6) when the matrix D is an identity matrix. Note that $d_p(D)$ is of the same form as the generalized gradient system $d(D)$ defined previously as:

$$d(D): \dot{x} + Df(x) = 0 \quad (F)$$

Let $dA(\delta_s)$ denote the stability boundary of a stable equilibrium $\delta_s$ of system (2-6) (or $d_p(I)$). Next, define the PEBS: The stability boundary differential $dA(\delta_s)$ of (2-6) is the PEBS.

Below, it is shown that the PEBS defined above is consistent with the geometrical construction suggested by Kakimoto:

Theorem 2-1

The PEBS intersects the level surface $\{\delta: V_p(\delta) = c\}$ orthogonally.

Proof:

It can be shown that:

$$\partial A(\delta_s) = \bigcup_i W^s(\delta_i) \quad (G)$$

where $\delta$ are the equilibrium points on the stability boundary differential $A(\delta)$. Since the gradient of $V_p(\delta)$ is a vector perpendicular to the level surface $\{\delta: V_p(\delta) = c\}$ in the increasing direction, it follows that the vector field is perpendicular to the level surface $\{\delta: V_p(\delta) = c\}$. Thus Theorem 2-1 is true.

Theorem 2-1 implies that in the direction orthogonal to the PEBS, the potential energy function $V_p(.)$ achieves a local maximum at the PEBS. Kakimoto, cited hereinabove, extends this fact and suggests an approximating scheme to find the PEBS. The goal of this scheme is to find the point at which the directional derivative of $V_p$ along the direction of the fault on trajectory achieves a local maximum. It is possible to go even further in suggesting a working definition of PEBS: consider that all rays emanating from $x_s$, and the local maxima of $V_p(.)$ on these rays are joined together as the "PEBS".

The intuition behind the use of the potential energy maxima is that they represent the maximum energy (along the fault on trajectory) that can be converted into potential energy. Hence, if the fault is cleared before this point, all the kinetic energy can be converted into potential energy before the fault-on trajectory exits the stability region.

Essentially, the PEBS method proposed by Kakimoto for transient stability analysis provides a local approximation of the stability boundary of the original system (2-4). The application of the PEBS as a local approximation of the stability boundary proceeds in two steps.

Step 1: From the direction of the fault-on trajectory $(\delta(t), w(t))$, detect the point $\delta_*$ at which the projected trajectory $(\delta(t))$ crosses the PEBS. Let the value of $V_p(.)$ at $\delta_*$ be $v$. That is, $v = V_p(\delta_*)$.

Step 2: Use the connected constant energy surface of the set $\{(\delta,w): V(\delta,w) = V_p(\delta_*)\}$ containing the stable equilibrium point $(\delta_s, 0)$ as the local approximation of the stability boundary differential, $dA(\delta_s, 0)$.

Next, evaluate the local approximation of the stability boundary that the PEBS method provides. For this purpose, compare the stability boundary of the original system $d_p(M, D)$ and the stability boundary of the gradient system $d_p(I)$ (i.e., PEBS). Recall that the stability boundary of (2-4) or (2-6) is the union of the stable manifolds of the unstable equilibrium points on the stability boundary. For this reason, first examine the relationship between the equilibrium points on the stability boundaries of $d_p(D)$ and $d_p(M,D)$.

The following theorem reveals the relationship between the equilibrium points of the gradient system $d_p(D)$ and the original system $d_p(D,M)$.

Theorem 2-2 (relationship between the equilibrium points of $d_p(D)$ and $d_p(M,D)$)

(i) $(\delta)$ is an equilibrium point of $d_p(D)$ if and only if $(\delta, 0)$ is an equilibrium point of $d_p(M,D)$.

(ii) $(\delta)$ is a stable equilibrium point of $d_p(D)$ if and only if $(\delta_s, 0)$ is a stable equilibrium point of $d_p(M,D)$.

(iii) $N_s(J(d_p(D))$ at $\delta) = N_x(J(d_p(M, D))$ at $\delta,0)$ and $N_c(J(d_p(D))$ at $\delta) = N_s(J(d_p(M,D))$ at $\delta,0)$.

The relationship between the equilibrium points on the stability boundary of the original system (2-6) and the equilibrium points on the PEBS is shown below in theorem 2-3.

Theorem 2-3 (relationship between the stability boundary of the original system and the PEBS)

If the dynamical systems $d_p(M,D)$ and $d_p(D)$ satisfy assumptions $C_1$ and $C_2$ then (i) the equilibrium points $(\delta_i)$ on the PEBS correspond to the equilibrium points $(\delta_i, 0)$ on the differential $A_p(M, D)$ and $$\partial A_p(M,D) = \bigcup_{(\delta_{i,0}) \in \partial A_p(M,D)} W^s_{(M,D)}(\delta_i, 0) \quad \text{(H)}$$

(ii)

$$PEBS = \bigcup_i W^s_{(i)}(\delta_i).$$

where the following are assumed:

Assumption $C_1$: The intersections of the stable and unstable manifolds of the equilibrium points on the stability boundary satisfy the transversality condition.

Assumption $C_2$: The number of equilibrium points on the stability boundary is finite.

This theorem asserts that, if the one parameter transversality condition is satisfied, and the number of equilibrium points on the stability boundary is finite, then the equilibrium points on the PEBS correspond to the equilibrium points on the stability boundary of the original system (2-4). Moreover, the PEBS is the union of the stable manifolds of the equilibrium points, say $(\delta_i)$, i=1,2 ... n and the stability boundary of the original system is the union of the stable manifolds of the equilibrium points $(\delta_i,0)$, i=1,2 ... n.

Figures 7, 8:
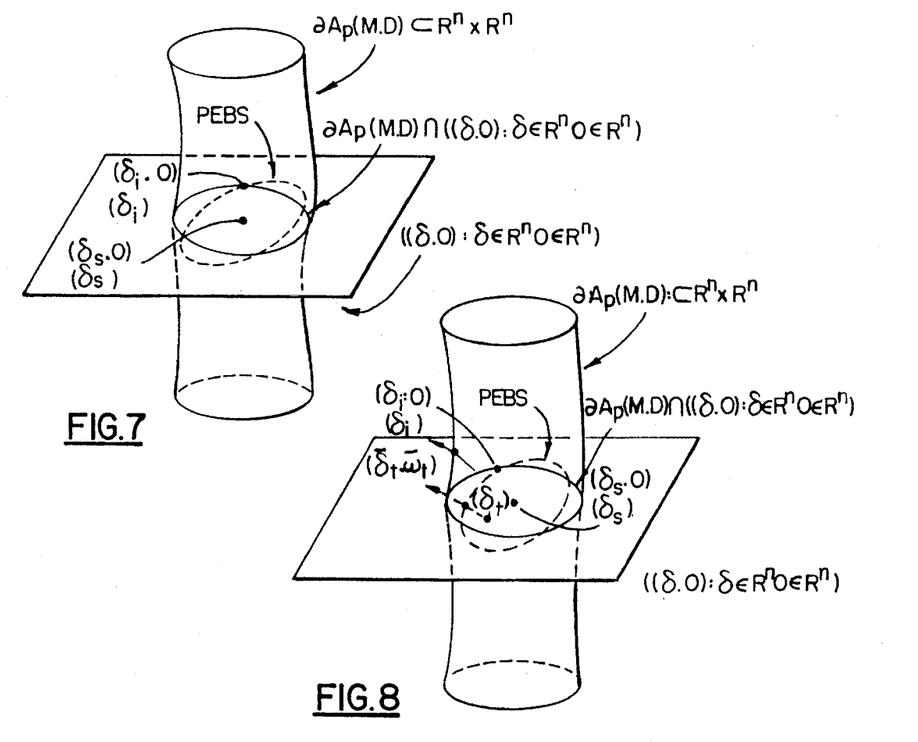
FIG. 7 illustrates a diagram of the relationship between the PEBS and the stability boundary of the original system.
FIG. 8 illustrates a diagram of the relationship between the stability boundary of the original system and the Potential Energy Boundary Surface.
Figure 9A:
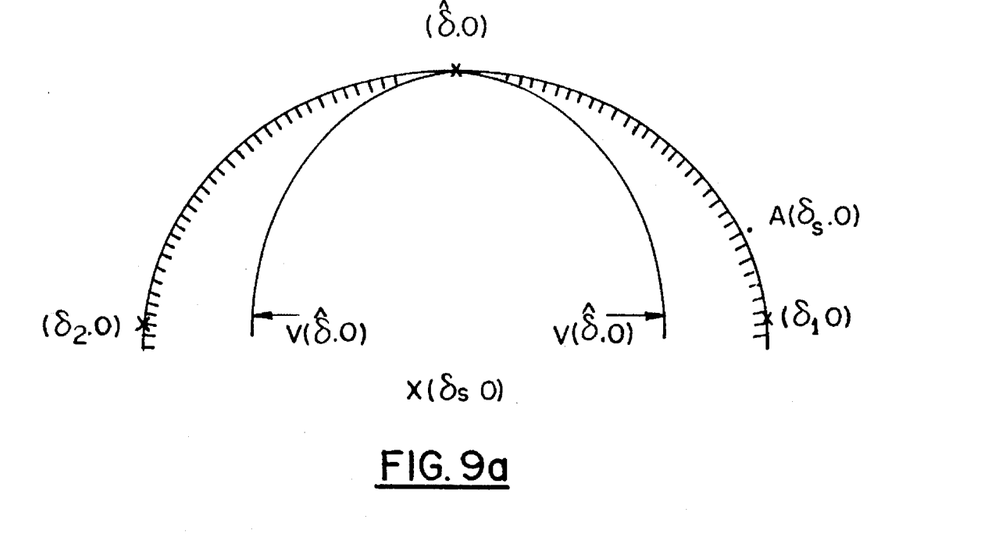
FIGS. 9a and 9b illustrate diagrams of the fact that the connected constant energy surface differential $V(\delta_o)$ can approximate part of the stability boundary, but that connected constant energy surface differential $V(\delta_1, w_1)$ may not.
Figure 9B:
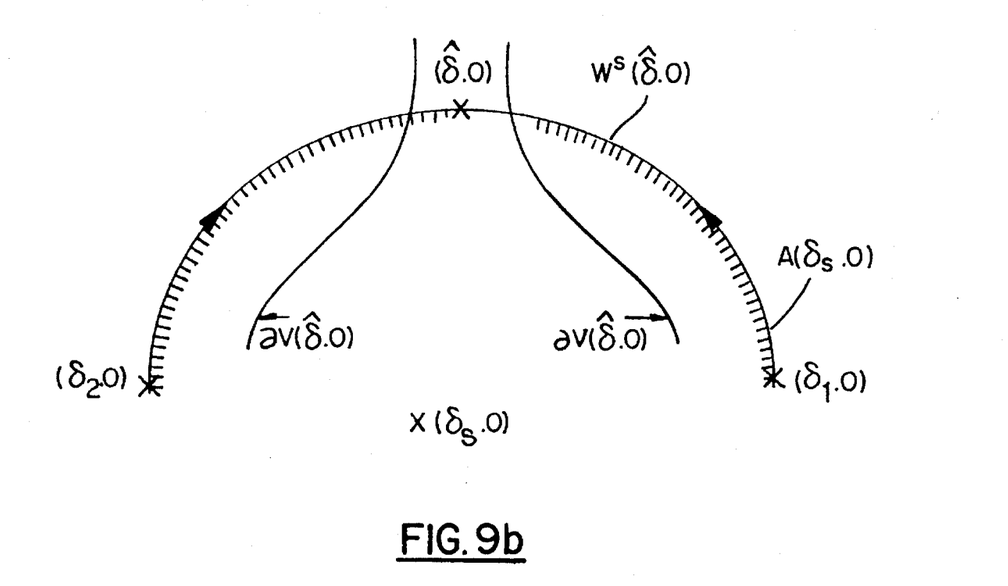

It is still uncertain whether the stable manifold in the PEBS and the intersection between the subspace $\{(\delta,w): w=0\}$ and the stable manifold of the corresponding equilibrium point in the stability boundary of the original system (2-6) are identical (see FIG. 7). Therefore, unlike the one machine infinite bus case, it cannot be claimed that the PEBS is the intersection of the stability boundary with the subspace $\{(\delta,w): w=0\}$.

Now, consider under what condition the PEBS method gives an approximation of the relevant local stability boundary of the original system (2-4). Recall that the point at which the fault-on trajectory leaves the stability boundary of the post-fault system is called the exit point. Note that the stability boundary of system (2-4) or system (2-6) is the union of the stable manifolds of the equilibrium points on the stability boundary. What is meant by the relevant local stability boundary is the stable manifold on which the exit point of the fault-on trajectory lies.

Given a fault-on trajectory $(\delta(t),w(t))$, let $\bar{\delta}_t, \bar{w}_t$ denote the exit point on the stability boundary of the original system (2-4), and let $\delta_p$ denote the exit point of the projected trajectory $\delta(t)$, which is the projection of the fault-on trajectory in the $\delta$ space of the reduced system (2-6) (see FIG. 8). Let $dV(x)$ denote the connected constant energy surface of $V(.)$ containing the stable equilibrium point $(\delta_s,0)$ passing through the point x (i.e., $dV(x):=$ the connected component of the set $\{(\delta,w): V(\delta,w)= V(x)\}$ containing the stable equilibrium point $(\delta,0)$). The idea of the PEBS method is to use the set differential $V(\delta_i,0)$ to approximate the relevant local stability boundary of the original system (2-4).

To see how good the set $dV(\delta_i,0)$ is in approximating the relevant local stability boundary of the original system (2-4), proceed with the following theorem. Use the notation $V_c(x)$ to denote the connected component of the set $\{(\delta,w): V(\delta,w)<V(x)\}$ containing the stable equilibrium point $(\delta_s,0)$.

Theorem 2-4

Let $(\hat{\delta},0)$ be an equilibrium point on the stability boundary differential, $dA(\delta_s,0)$ of system (2-4). Then (i) the connected constant energy surface differential, $dV(\hat{\delta},0)$ intersects with the stable manifold $W_s(\hat{\delta},0)$ only at the point $(\hat{\delta},0)$; moreover, the set $V_c(\hat{\delta},0)$ does not contain any point which belongs to the stable manifold $W_s(\hat{\delta},0)$.

(ii) Suppose $(\delta_1,w_1)$ is an element of set $\{W_s(\hat{\delta},0), (\delta_1, w_1)$ not equal $(\hat{\delta},0)\}$ and the equilibrium point $(\hat{\delta},j_0)$ is of type k. Then the dimension of the set which is the intersection between the connected constant energy surface differential, $dV(\delta_1,w_1)$ and the stable manifold $W_s(\hat{\delta},0)$ is 2n-k-1; moreover, the set $V_c(\delta_1,w_1)$ does contain points which belong to the stable manifold $W_s(\hat{\delta},0)$.

Figure 10A:
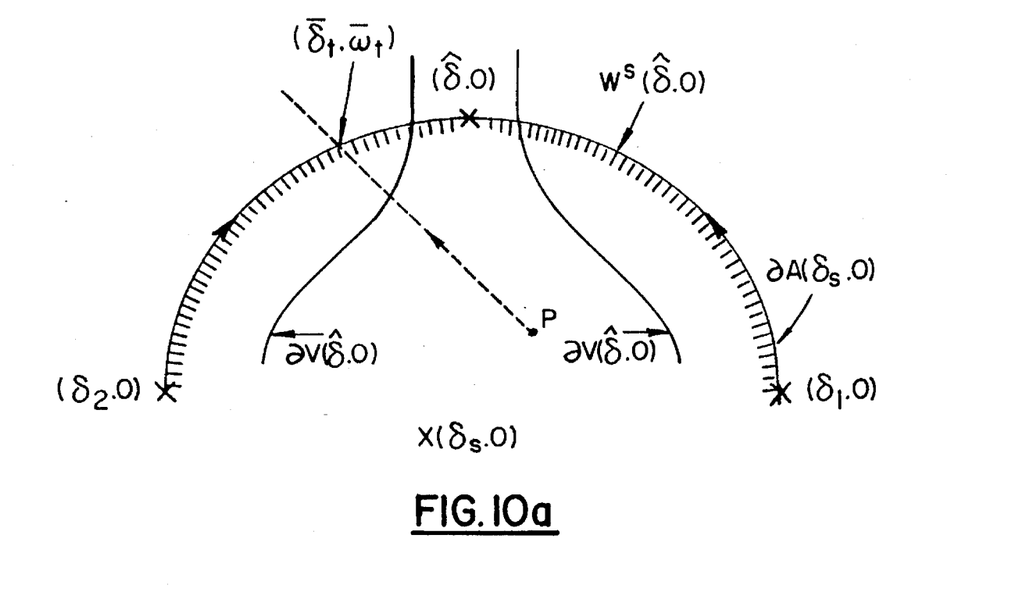
FIGS. 10a and 10b illustrate diagrams of when the connected constant energy surface differential $V(\delta_1, w_1)$ is used to approximate the stability boundary.

Part (i) of theorem 2-4 implies that for any fault on trajectory $x_{f(t)}$ starting from a point p with p part of the set $A(\delta_s,0)$ and $V(p)<V(\hat{\delta},0)$, if the exit point of this trajectory lies on the set $W_s(\hat{\delta},0)$, then the fault on trajectory must pass through the connected constant energy differential, $dV(\hat{\delta},0)$ before it passes through the stable manifold $W_s(\hat{\delta},0)$, (thus leaving the stability boundary $d(\delta_s,0)$. This suggests that the connected constant energy surface differential $(\hat{\delta},0)$ can be used to approximate part of the stability boundary $dA(\delta_s,0)$ (i.e., the stable manifold $W_s(\hat{\delta},0)$ part). This is the essence of the controlling UEP method. (See FIG. 10a.)

Figure 10B:
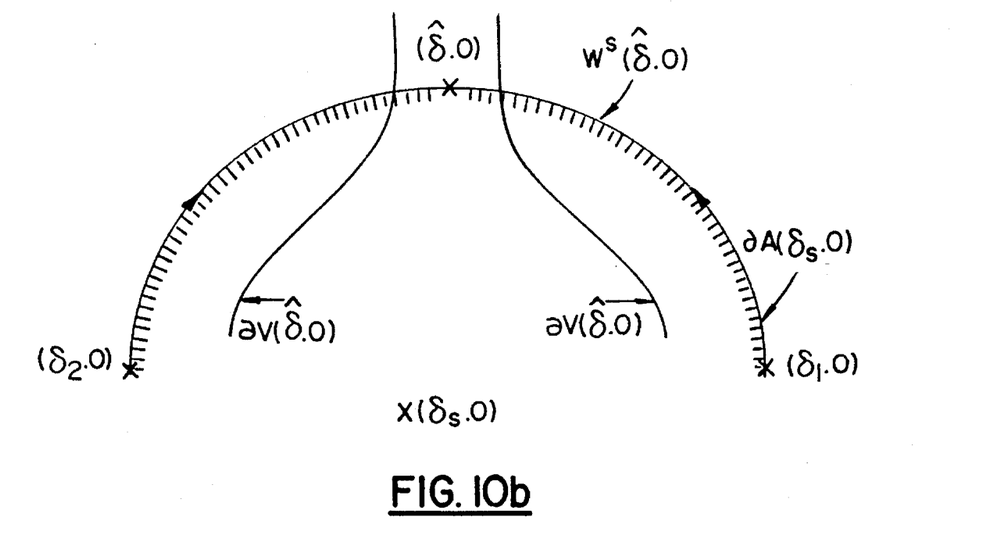

Part (iii) of theorem 2-4 indicates that the fault-on trajectory $x_{f(t)}$ may pass through the connected constant energy surface $dV(\delta_1,w_1)$ after it passes through the stable manifold $W_s(\hat{\delta},0)$. It is therefore unwise to approximate the relevant part of stability boundary (i.e., the stable manifold $W_s(\hat{\delta},0)$) by the connected constant energy surface $dV(\delta_1,w_1)$. (See FIG. 10b.) It is clear that part of the connected constant energy surface $d(\delta_1,w_1)$ may lie outside the stability boundary $dA(\delta_s,0)$.

However, for the purpose of power system transient stability analysis, if the fault-on trajectory $x_{f(t)}$ passes through the surface differential $dV(\delta_1,w_1)$ before it passes through the stable manifold $W_s(\hat{\delta},0)$, the PEBS method still provides a good approximation of the relevant local stability boundary for this fault-on trajectory $x_{f(t)}$. (See FIG. 10a.) On the other hand, the PEBS method fails when the fault-on trajectory passes through the surface differential $dV(\delta_1,w_1)$ after it passes through the stable manifold $W_s(\hat{\delta},0)$. Note that in this case, the fault-on trajectory $x_{f(t)}$, after passing through the stable manifold $W_s(\hat{\delta},0)$ becomes unstable for the post-fault system, but is still classified as stable by the PEBS method as long as this fault-on trajectory does not pass through the surface, differential, $dV(\delta_1,w_1)$. (See FIG. 10b.)

Therefore, based on the above arguments, it follows that if the conditions below are satisfied:

(i) $(\delta_1)$ is on the stable manifold of $(\hat{\delta})$ implies $(\bar{\delta}_t, \bar{w}_t)$ is on the stable manifold of $(\hat{\delta},0)$; and (ii) the fault-on trajectory $(\delta(t),w(t))$ passes through the constant energy surface differential, $dV(\hat{\delta}_i,0)$ before it passes through the stable manifold $W_s(\hat{\delta}, 0)$;

then the PEBS method gives a good approximation of the relevant local stability boundary of the original system for the given fault-on trajectory $(\delta(t),w(t))$.

It is difficult to check whether condition (ii) above is satisfied. This is mainly because finding the exit point $(\bar{\delta}_t, \bar{w}_t)$ for the fault-on trajectory $(\delta(t),w(t))$ is difficult. However, a computational scheme to detect the exit point $(\delta_p)$ of the projected fault-on trajectory was proposed by Kakimoto, cited hereinabove. Theorem 2-4 provides a solution for this difficulty and suggests that the condition (ii) is always satisfied if the PEBS method is modified as follows:

Step 1': From the fault-on trajectory $(\delta(t),w(t))$ detect the point $\delta_*$ at which the projected trajectory $\delta(t)$ crosses the PEBS. Let the value of $V_p(.)$ at $\delta_*$ be v (i.e., $v=v_p(\delta)$).

Step 2': Find the equilibrium point of system (2-6) whose stable manifold contains the point $\delta_*$, say $\hat{\delta}$. Let the value of $V_p(.)$ at $\hat{\delta}$ be v (i.e., $v=V_p(\hat{\delta})$).

Step 3': Use the connected constant energy surface of the set $\{(\delta,w): V(\delta,w)=V_p(\hat{\delta})\}$ containing the stable equilibrium point $(\delta_s, 0)$ as the local approximation of the stability boundary $\partial A(\delta_s, 0)$.

Based on previous work, step 2' can be implemented by the following procedure:

Step (i): Use the point $\delta_*$ as the initial condition and integrate the post-fault gradient system (2-6) until the local minimum of $V_p(\delta)$ with respect to $\delta$ is achieved, say $\delta_o$.

Step (ii): Find the equilibrium point of the post-fault reduced system using $\delta_o$ as the initial guess (i.e., solve the equation derivative $V_p(\delta)$ with respect to $\delta=0$). The solution is the required one, $\hat{\delta}$.

Table 1 below shows the results of a test on a 118-bus power system that compares the critical clearing time prediction of different approaches to transient stability analysis.

TABLE 1

Power System Test

| Fault Location at Bus | Simulation Technique (sec) | PEBS Method (sec) | Invention Method sec |
|---|---|---|---|
| 10 | 0.18 | 0.17 | 0.17 |
| 100 | 0.22 | 0.27 | 0.18 |
| 90 | 0.34 | 0.34 | 0.34 |
| 68 | 0.46 | 0.57 | 0.43 |
| 40 | 0.57 | 0.57 | 0.57 |
| 112 | 0.66 | 0.64 | 0.63 |

The controlling UEP method of the invention has been applied to a 118-bus system with 20 generators. Faults were created, including faults on both generator and load buses. Table 1 shows the critical clearing time of six faulted systems using three different methods: numerical integration technique, potential energy boundary surface method and the controlling UEP method of the present invention. This table demonstrates that the inventive method offers fairly accurate direct analysis of transient stability for these faults. Note that the PEBS method gives an over estimate of the critical clearing time when a fault occurs at bus #100, a severe fault and gives a serious over estimate when a fault; occurs at bus #68, a mild fault.

Through the application of the inventive method system, transient stability is assured. The inventive method provides the capability to predetermine a time to close a circuit breakers opened when the event disturbance occurred, thus clearing the fault-on situation and returning the system to a post-fault, steady state operating environment.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

For example, while commercial high power generating and distributing systems are described primarily herein, the invention is not limited to such industrial systems, but may also find application in any other electrical power systems such as telecommunications, computer networks, distributed robotic controls and the like.

Having thus described the invention what is desired to be protected by Letters Patent is presented by the appended claims.

What is claimed is:

1. In an electrical power system having a plurality of buses and means for restoring continuity in circuits after an event disturbance has interrupted continuity thereof, and including a detection system for assuring transient stability of the electrical power system, comprising:

a) means for detecting on-line electrical system interruption of a bus; and b) means for restoring continuity in said interrupted electrical system at a predetermined time after said event disturbance has occurred, said predetermined time being calculated as a function of on-line fault conditions and as a function of a stability boundary.

2. In an electrical power system having a plurality of buses and means for restoring continuity in circuits after an event disturbance has interrupted continuity thereof, an on-line detection system for assuring transient stability of the electrical power system, comprising:

a) means for detecting on-line, an electrical power system interruption of a bus; and b) means for restoring continuity in said interrupted electrical power system at a predetermined time after said event disturbance has occurred, said detection system calculating said predetermined time as a function of on-line fault conditions and as a function of a stability boundary.

* * * * *